United States Patent [19]
Castagne

[11] Patent Number: 5,307,628
[45] Date of Patent: May 3, 1994

[54] EXHAUST LINE ALLOWING A FASTER TRIGGERING OF THE CATALYST

[75] Inventor: Michel Castagne, Palaiseau, France

[73] Assignee: Institut Francais du Petrole, Rueil Malmaison Cedex, France

[21] Appl. No.: 900,271

[22] Filed: Jun. 18, 1992

[30] Foreign Application Priority Data

Jun. 18, 1991 [FR] France .................. 91 07560

[51] Int. Cl.$^5$ .............................................. F01N 3/28
[52] U.S. Cl. ........................................ 60/284; 60/300; 422/176
[58] Field of Search ................. 60/300, 284, 286, 299, 60/288; 422/176

[56] References Cited

U.S. PATENT DOCUMENTS 4,449,362 5/1984 Frankenberg ................. 60/286

FOREIGN PATENT DOCUMENTS 431985 6/1991 European Pat. Off. ............. 60/284
145813 11/1979 Japan ................................ 60/284
64613 3/1991 Japan ................................ 60/284

Primary Examiner—Douglas Hart
Attorney, Agent, or Firm—Antonelli, Terry, Stout & Kraus

[57] ABSTRACT

Device intended to improve the working of a catalyst (3) placed in the exhaust manifold of an internal-combustion engine, said exhaust manifold consisting of a tube (2) opening on one side into the collector (1) collecting the combustion gases coming from the cylinder(s) and covering with the other end thereof said catalyst (3).

According to the invention, the device comprises:
  at least one pipe (8) inside said tube (2), having a first end (81) which opens in proximity to said catalyst (3), and
  a means (10) intended to selectively close the intertube volume (9) delimited between said inner pipe (8) and said tube (2) as a function of the temperature of the exhaust gases flowing onto said catalyst (3).

7 Claims, 3 Drawing Sheets

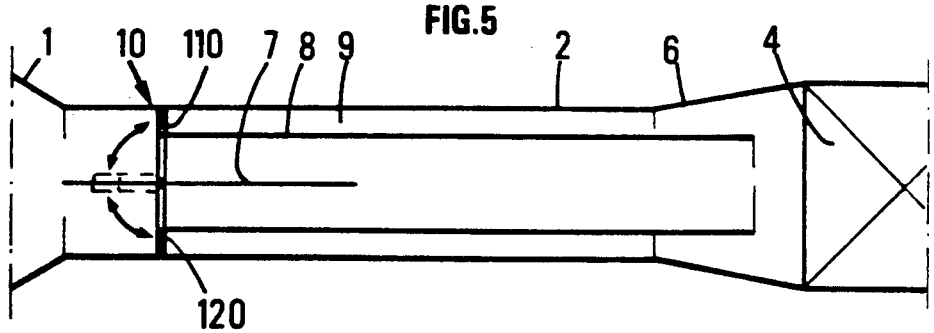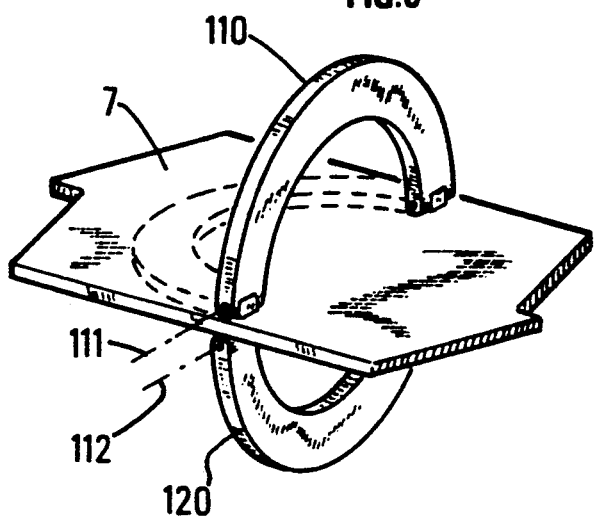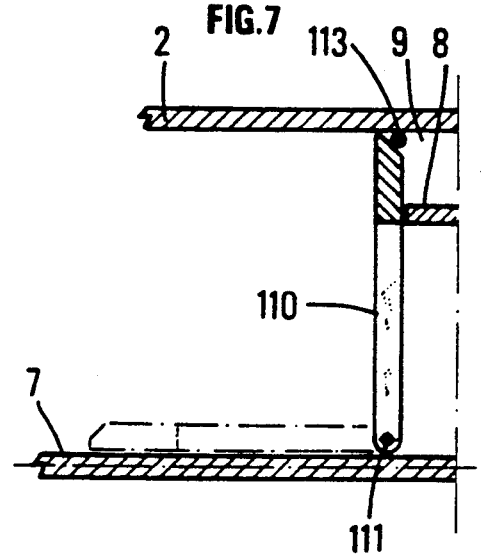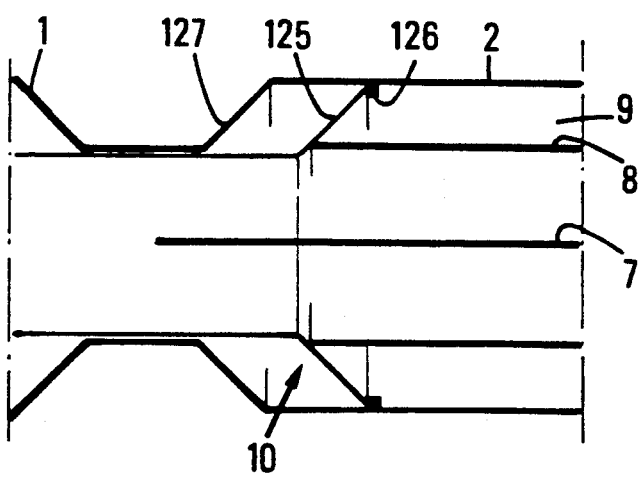

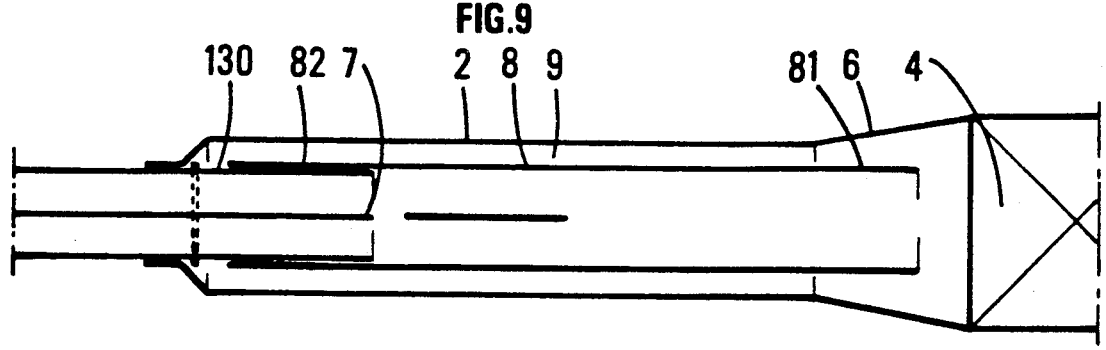
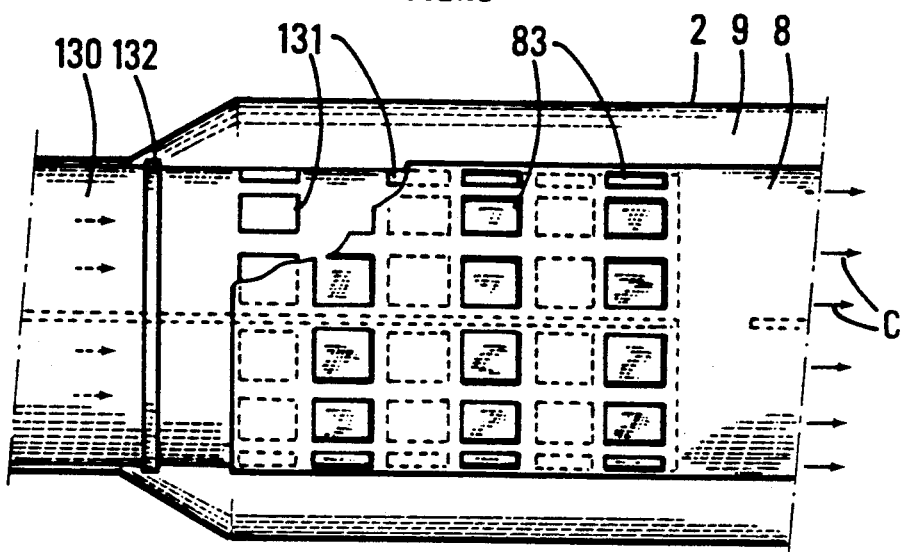
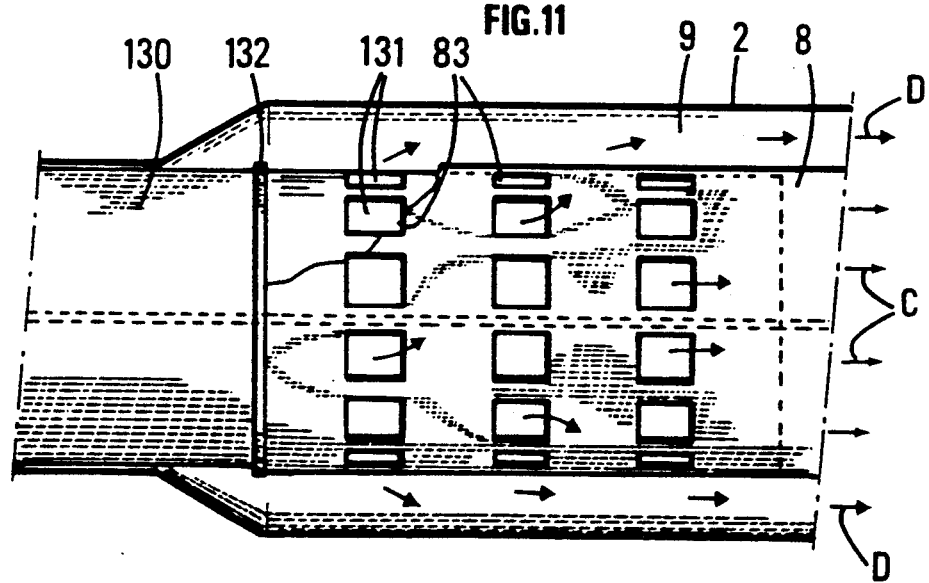

EXHAUST LINE ALLOWING A FASTER TRIGGERING OF THE CATALYST

BACKGROUND OF THE INVENTION

The present invention relates to internal-combustion engines whose exhaust line comprises at least one catalyst.

The purpose of a catalyst generally consists in activating the oxidation (COHC) or reduction ($NO_2$) reactions which take place in the natural state and which lead to the deposition of polluting bodies inside the exhaust line but some kinetics of which are too slow at the temperature of the exhaust gases.

A catalyst or catalytic muffler placed on the exhaust line of an engine is intended to reduce the emissions of some pollutants such as CO, HC, $NO_x$, . . . which are present in the exhaust gases.

However, when cold, a catalytic muffler has no effect on the pollutants released by the engine. A catalytic muffler must therefore reach a minimum temperature to start taking effect. There is thus a delay period known as priming delay during which the pollutant emissions are not decreased by the catalyst. This delay must therefore be as short as possible. The triggering or priming time of a catalytic muffler is commonly about 2 minutes.

Standards in force in most industrialized countries establish the limits allowed for the emission of pollutants.

PRIOR ART

Several systems have already been proposed in order to have a temperature rise of the catalyst as fast as possible.

It is a conventional process to very carefully insulate the catalyst in order to limit heat losses. Patent application EP 0,177,479 discloses such an example.

However, the drawback of the heat insulation of catalysts lies in an overheating of the catalysts once they are primed.

In a different way, the applicant has proposed in French patent application FR 2,608,677 a device and a process for the rapid priming of a catalyst according to which a branch pipe is provided on the main exhaust line in order to modulate the injection of exhaust gases towards the catalyst.

Patent application DE 3,406,968 relates to a device providing a fast temperature rise of a catalyst, which comprises two different lines, one cooled and the other one non cooled, which join upstream from the catalyst and whose flow rate is adjusted as a function of the temperature of the catalyst.

Application PCT WO 89/10,470 discloses an electric resistor heating system installed as close as possible to the catalyst.

This heating method is doubtless efficient but difficult to implement. Besides, the resistor is likely to generate local overheatings harmful to the catalyst integrity.

Lastly, document EP-A1-0,177,479 may be cited as a technological background since it shows a conventional catalyst which is thermally well-insulated and fitted with a grid intended to better distribute the gases in the catalyst.

The present invention allows to remedy the above-mentioned drawbacks by proposing an improved exhaust line.

OBJECTS OF THE INVENTION

The main object of the invention lies in an improvement of the exhaust line, notably as regards the priming time of the catalyst.

Another object of the present invention consists in better distributing the flow of the exhaust gases entering the catalyst in order to improve the performances thereof when warm.

The criteria necessary for improving the efficiency of a catalyst when cold are:
- a restricted section of injection of the exhaust gases into the catalytic muffler so as to generate a warm zone favouring the triggering of the reactions;
- a thermal insulation of the line;
- a limitation of the residence time of the gases in the line in order to limit heat losses.

Moreover, to improve the efficiency and the behaviour of the catalyst when warm, it is necessary:
- to have a large section at the level of the injection of the exhaust gases on the catalytic muffler;
- to allow the elimination of heat peaks by means of heat losses on the line, upstream from the catalyst;
- to provide a good homogeneity of the velocities in this section.

As may be seen, these criteria are contradictory, and this is why most of the designs proposed until now improve the performances of the catalytic muffler either when warm or when cold.

In a different way, the present invention is intended to improve the working of a catalyst when warm as well as when cold.

SUMMARY OF THE INVENTION

To that effect, the object of the present application is a device placed inside the exhaust manifold of an internal-combustion engine, said manifold opening on one side into the collector collecting the combustion gases coming from the cylinder(s), and ending with the other end thereof in the catalyst.

According to the invention, the devices comprises a pipe, internal and of restricted section with respect to said manifold, of low thickness and having a first end opening in proximity to said catalyst, and a means intended to selectively close the (intertube) volume delimited between said pipe and the manifold, as a function of the temperature of the catalyst.

According to one embodiment of the invention, said selective closing means consists of an annular bimetallic strip fixed onto the end of the inner pipe.

According to another embodiment of the invention, said selective closing means consists of an annular member whose section totally covers the inlet of said intertube space when the catalyst is not primed.

More precisely, said annular member may consist of two half rings, each half ring being able to rotate round a substantially diametral axis so that each half ring may be brought to the central part of the outlet of the pipes when the intertube volume must be permeable to the exhaust gases.

Without departing from the scope of the invention, the closing member is annular and consists of a collar which may slide axially between a first and a second dog, said dogs corresponding respectively to the closing of the intertube space and to the opening of said space in relation to the exhaust gases.

Said selective closing means advantageously consists of a perforated tubular member arranged telescopically with respect to part of the inner pipe, perforations in the tubular member and in the inner pipe co-operating in order to close selectively said intertube volume.

The selective closing means is preferably placed at the end of the pipe connected to the collector.

BRIEF DESCRIPTION OF THE DRAWINGS

Other features and advantages of the present invention will be clear from reading the description hereafter, with reference to the accompanying drawings in which:

FIG. 5 is a longitudinal section of another embodiment of the invention, comprising a closing member consisting of two half rings;

FIG. 6 is a perspective view of the closing half rings;

FIG. 7 is a simplified section showing the working of the annular closing member;

FIG. 8 is a partial longitudinal section of another embodiment of the invention provided with a sliding closing collar;

FIG. 9 is a longitudinal section of an embodiment of the invention comprising as a selective closing member a perforated double pipe;

FIGS. 10 and 11 show in simplified perspectives the double closing pipe means, respectively in the closed and in the open position.

DESCRIPTION OF THE PREFERRED EMBODIMENTS

Figure 1:
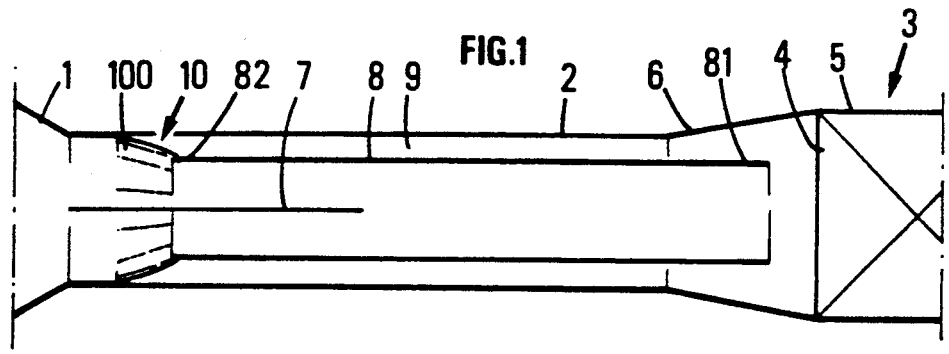
FIG. 1 is a longitudinal section of a first embodiment of the invention.

As it appears in FIG. 1 notably, the exhaust line of a multicylinder engine conventionally comprises a collector 1 in which the exhaust lines of the different cylinders join, and a tube 2 or exhaust tube.

The present invention relates to single-cylinder or multicylinder engines whose exhaust line further comprises a catalyst or catalytic muffler intended to remove the emissions of the exhaust gases.

As it is well-known, a catalytic muffler 3 may consist of a ceramic monolith 4 forming the catalyst support itself. This catalyst support is full of several thousand parallel channels which the exhaust gases flow through. The monolith may also be made of metallic sheets.

The catalytic active substance is generally a precious metal such as platinum, palladium and/or rhodium, deposited on a porous layer called wash-coat, which is intended to increase the gas-catalytic element contact surface. This porous layer is most often made of alumina.

Monolith 4 may for example be surrounded with a ceramic felt (not shown) for the thermal insulation and the protection thereof against vibrations, shocks, etc. Monolith 4 is preferably located in a casing 5 made of stainless steel for example.

It is well-known to connect this casing 5 through a cone 6 to exhaust tube 2.

A partition plate 7 may also be placed at the outlet of collector 1 in order to move the zone of mixing of the different gaseous flows away from collector 1.

The present invention advantageously relates to an exhaust line such as that which has been described.

According to the invention, at least one relatively thin pipe called "inner pipe" 8 of a section such that an annular space 9, also called intertube space in the following text, is provided, is arranged in exhaust tube 2.

Inner pipe 8 comprises one end 81 located in the conical space defined by cone 6 in proximity to monolith 4, on which it generates a jet effect at the centre. This pipe 8 may eventually be coated with a refractory material in order to improve the thermal behaviour thereof.

The second end 82 of pipe 8, located close to collector 1, is advantageously provided with a means 10 intended to selectively close the intertube space 9, as a function of at least one working parameter of the engine.

This parameter will preferably be the temperature measured at the level of the catalyst or at the level of the exhaust gases in collector 1. Any sensor known in itself may of course provide such information, but such a sensor is not always necessary.

Selecting a small section for inner pipe 8 is important since it favours the setting into operation of the cold catalyst by generating a "warm zone" at the centre of the catalyst, which starts the strongly exothermic catalytic reaction which extends thereafter to the whole monolith 4.

FIG. 1 shows a first embodiment of the invention according to which the selective closing means 10 consists of a bimetallic strip 100 connected to outer tube 2. The choice of the materials for bimetallic strip 100 is such that it closes space 9 when catalyst 3 is not primed, i.e. when it has not reached a given temperature. The closing device needs not be totally tight.

Figure 2:
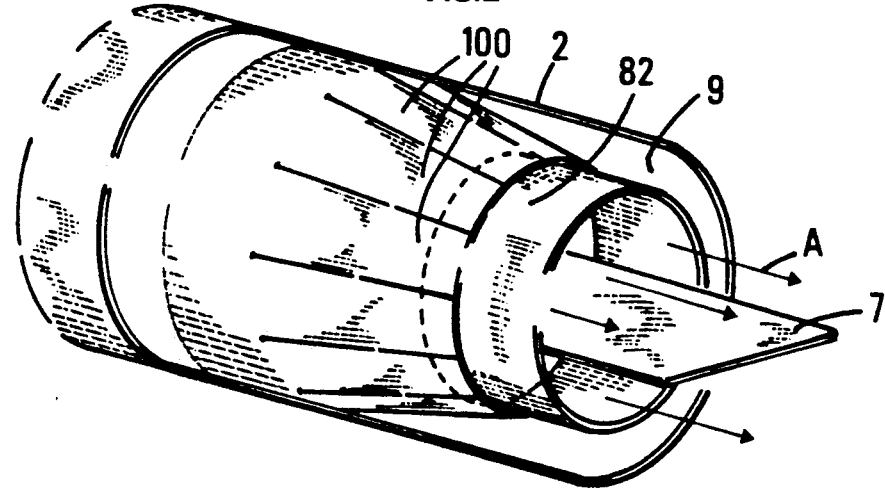
FIGS. 2 and 3 are simplified perspectives showing the closing means respectively in the position of closing, then of opening of the intertube volume.

FIG. 2 shows the path A of the exhaust gases in this case. A substantially static gas lamina generally comprising fresh air is thus present in the intertube space 9, which thermally insulates the line. Besides, pipe 8 being thin, the heat losses in this pipe are more minimized.

However, the heat insulation of the exhaust line must not be too rigidly set because, conversely, when the exhaust gases reach very high temperatures (higher than 900° C. for example) at the engine outlet, it is essential not to generate too high thermal shocks which might damage the monolith irreversibly.

This is why a certain heat dissipation is necessary upstream from the catalyst under certain working conditions. The invention provides to this effect that means 10, for example in the form of bimetallic strip 100, is capable of uncovering space 9 when the temperature of the exhaust gases and/or of catalyst 4 has reached a given threshold value.

Figure 3:
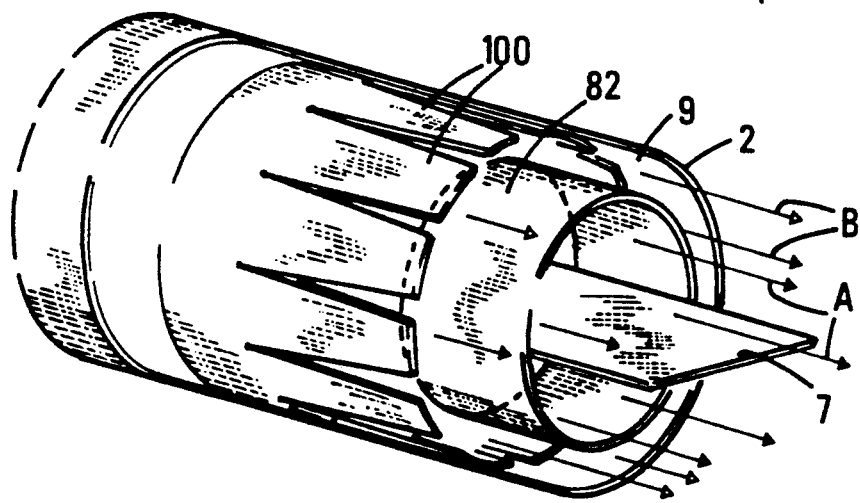

FIG. 3 shows the path B of the exhaust gases in this case. Thus, the exhaust gases flow onto the total section of monolith 4. Besides, a certain heat dissipation may occur upstream from the monolith.

Finally, the complete opening of the intertube space 9 allows to limit the pressure drops upstream from the monolith and to maintain high and homogenous gas flow velocities.

Figure 4:
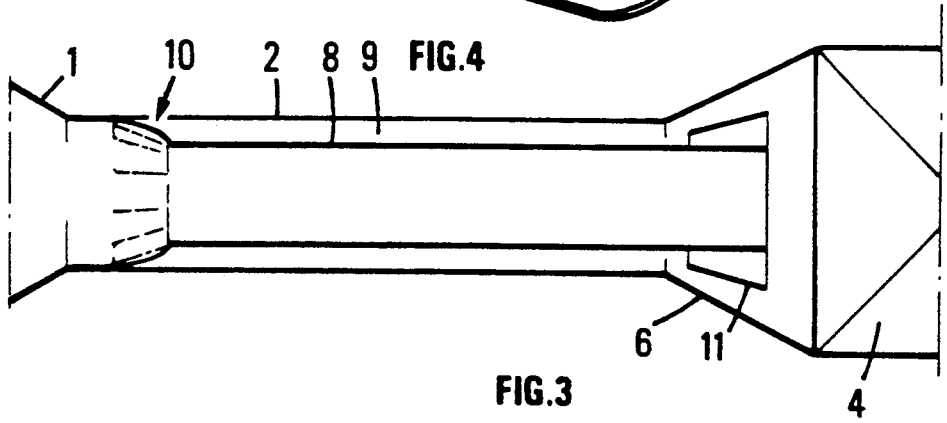
FIG. 4 is a longitudinal section, in a perpendicular plane, of an embodiment of the invention close to that of FIG. 1.

FIG. 4 shows the end 81 of pipe 8 which is surrounded with fins 11 intended to better homogenize the velocities of the gases having flowed through space 9. A better distribution of the gases, towards the total surface of monolith 4, is obtained by means of these fins. In fact, catalyst 4 being commonly an ovaloid, the fins 11 have been arranged so as to better distribute the gases.

Any means known in itself may be used for forming fins 11. The fastening thereof may for example be achieved on the metallic surface of cone 6 of the catalyst, simply by welding.

The good distribution of the gases over the whole surface of the catalyst is actually very important.

FIG. 5 shows another embodiment of the invention, which differs from that of FIG. 1 in means 10 for the selective closing of space 9.

FIG. 6 shows in a more detailed way means 10 which consists of two half rings 110 and 120, each one being mobile in rotation around a substantially diametral axis (111 and 112 respectively). Hinge type means (not referenced) are preferably fastened between each half ring 110, 120 and partition plate 7, so as to allow the rotation of each of half rings 110, 120 between a position of closing of space 9 shown in full line in the figure and a full opening position (dot-and-dash line) in which the half rings closely lean against plate 7, in the central part of tube 2.

Plate 7 is however not necessarily present. It may be envisaged in this case, without departing from the scope of the invention, to rotate each of the two half rings 110, 120 by means of two axes 111, 112, actuated from the outside of tube 2 by any means known in itself and under the conditions described above. The two axes may be easily meshed with one another.

FIG. 7 shows in detail a preferred profile of each half ring 110, 120 whose peripheral part is bevelled in order to improve the aerodynamics of the gaseous flow when the half rings are in the open position. Besides, a collar forming a dog 113 may be advantageously provided inside tube 2 so as to fix each half ring in the maximum position of covering of intertube space 9.

FIG. 8 shows a partial longitudinal cross-section of another embodiment of selective closing means 10 according to the invention. In this figure, a sliding collar 125 is provided; it may translate from a "rear" position such as that shown in this figure, corresponding to the closing of intertube space 9. A dog 126 may be provided in order to limit the path of collar 125. In the open position, collar 125 abuts for example against the inner wall 127 of tube 2. Any other means may be used for forming the dogs. A linkage may actuate the collar in translation, as a function of the temperature of the exhaust gases.

FIGS. 9 to 11 show another embodiment example of the selective closing means according to the invention.

FIG. 9 is a longitudinal section of the exhaust line according to the invention, i.e. equipped with the inner pipe 8 opening in proximity to monolith 4 (or catalyst) and with a selective closing means.

The selective closing means consists here of a perforated pipe 130 telescopically mounted inside pipe 8, over part of the length thereof at the level of the end 82 thereof. Perforated pipe 130 extends up to the inside of collector 1.

The end 82 of pipe 8 is also provided with perforations 83 which co-operate with the perforations 131 of pipe 130.

The number and the shape of perforations 131 and 83 are such that, in a certain position, end 82 is totally closed.

FIG. 10 shows a positioning of pipes 130 and 8 in which all the exhaust gases flow through pipe 8. Arrows C show the path of the gases when perforations 83 and 131 are juxtaposed to one another, thus forming a full wall from collector 1 to the inside of pipe 8.

A translation movement for example of pipe 130 allows to superpose the respective perforations of both pipes, i.e. to generate passageways for the gases circulating in inner pipe 8. The gases may thus flow through annular space 9, as shown by arrows D in FIG. 11.

A dog 132 may be provided on pipe 130 so as to define notably the full opening and the full closing positions. Intermediate opening positions may be advantageously provided, resulting in a modulation of the flow of gas in intertube space 9.

Of course, another movement of pipe 130 (rotation for example) might lead to the opening of the end 82 of pipe 8, without departing from the scope of the invention.

Besides, any means known in itself may be envisaged for actuating pipe 130.

The various possibilities mentioned above for the selective opening means are of course not at all limitative.

The man skilled in the art will be able to conceive from the above description other modifications and/or additions without departing from the scope of the present invention.

I claim:

1. A device for improving the working of a catalyst placed in the exhaust manifold of an internal-combustion engine, said exhaust manifold comprising a tube connected to one side of a collector collecting the exhaust gases coming from the engine and opening at the other end thereof onto an inlet cone of said catalyst, said device comprising:

an inner pipe located inside said tube, said inner pipe being arranged coaxially with said tube and having a restricted section with respect to said tube, a small thickness and a first end opening in proximity of said catalyst, and means for selectively closing an intertube space delimited between said inner pipe and said tube, as a function of the temperature of the exhaust gases led towards said catalyst so that the exhaust gases warm up a central portion of the catalyst when the selective closing means closes the intertube space.

2. A device as claimed in claim 1, wherein said selective closing means comprises an annular bimetallic strip fastened onto said tube.

3. A device for improving the working of a catalyst placed in the exhaust manifold of an internal-combustion engine, said exhaust manifold comprising a tube connected comprising a tube connected to one side of a collector collecting the exhaust gases coming from the engine and opening at the other end thereof onto an inlet cone of said catalyst, said device comprising:

an inner pipe located inside said tube, said inner pipe being arranged coaxially with said tube and having a restricted section with respect to said tube, a small thickness and a first end opening in proximity of said catalyst, and means for selectively closing an intertube space delimited between said inner pipe and said tube, as a function of the temperature of the exhaust gases led towards said catalyst, said selective closing means comprising an annular member whose section completely covers the inlet of said intertube space when the catalyst is not primed.

4. A device as claimed in claim 3, wherein said annular member comprises two half rings and wherein each half ring may rotate around a substantially diametral axis so that each half ring may be led towards the central part of the inlet of the inner pipe when the intertube space must be permeable to the exhaust gases.

5. A device as claimed in claim 3, wherein said annular member comprises a collar which may slide axially between a first dog and a second dog, said dogs corresponding respectively to the closing of intertube space and to the opening of said space with respect to the exhaust gases.

6. A device as claimed in claim 1, wherein said selective closing means comprises a perforated tubular member arranged telescopically with respect to a part of the inner pipe, perforations in the tubular member and in the inner pipe co-operating so as to selectively close said intertube space.

7. A device as claimed in any one of the previous claims, further comprising means for homogenizing the velocities of the exhaust gases at the inlet of said catalyst.

* * * * *